United States Patent [19]

Smith

[11] Patent Number: 4,955,709

[45] Date of Patent: Sep. 11, 1990

[54] SUN SCREENING DISPLAY AND ADVERTISING DEVICE

[76] Inventor: Anton K. Smith, 610 E. 6th St., Little Rock, Ark. 72202

[21] Appl. No.: 42,037

[22] Filed: Apr. 24, 1987

[51] Int. Cl.⁵ .......................... G02C 7/16; G02C 7/10
[52] U.S. Cl. .......................................... 351/46; 351/44
[58] Field of Search ................. 351/41, 44, 46; 2/425, 2/429, 430; 428/187

[56] References Cited

U.S. PATENT DOCUMENTS

| 1,959,915 | 5/1934 | Guthrie | 351/46 |
| 2,116,411 | 5/1938 | Philipson | 351/46 |
| 4,673,609 | 6/1987 | Hill | 428/187 |

FOREIGN PATENT DOCUMENTS 0042129 4/1977 Japan.

2095420 9/1982 United Kingdom ............... 351/46

OTHER PUBLICATIONS

Popular Mechanics, "Those Pinhole Peepers", Nov. 1964.

*Primary Examiner*—Rodney B. Bovernick
*Attorney, Agent, or Firm*—Richard C. Litman

[57] ABSTRACT

A sun-shielding type of eyeglasses having lenses made of an opaque material provided with a plurality of closely-spaced, small holes to permit vision by the wearer, while excluding a high percentage of external light and glare from reaching the eye of the wearer. The exterior surface of the lenses are suitable for the application of designs or advertising messages, while the interior surfaces are provided with a dark, matte finish to reduce reflection of light off of the skin of the wearer.

7 Claims, 1 Drawing Sheet

SUN SCREENING DISPLAY AND ADVERTISING DEVICE

BACKGROUND OF THE INVENTION

The present invention relates to a device which provides an advertising medium that is conspicuous and impressive. It is designed to generate repetitive and prolonged public exposure of printed material, and the like. The utility, construction, and attractiveness of the present invention will not only tend to entice the public to purchase and use the device of the invention —this alone, making it valuable merchandise, but each of the aforesaid qualities of the present invention will generate consumers' continued and repeated use and exhibition of the advertising device, greatly improving its effectiveness. The present invention is an article of utility and adornment to be worn by a person. More specifically, the present invention is an advertising and display device in the form of uniquely constructed spectacles.

The present invention relates to glasses for shielding the eyes of the viewer from high, light levels and, at the same time, providing a surface on the glasses for the display of ornamental designs or advertising messages. The lenses of the sun-shielding glasses are made of a perforated-sheet material, having a uniform or otherwise appropriate pattern of small holes to permit the wearer to have relatively unobstructed and normal vision, while preventing a high percentage of light from reaching the eye of the wearer. The use of a material having very small holes provides a perforate surface which may be printed or silk screened with decorative designs or advertising messages on the external surface of the lens for viewing by persons looking at the wearer of the glasses. Interchangeable lenses may be provided to enable the wearer to change the external design displayed, as desired.

DESCRIPTION OF THE PRIOR ART

Various prior art advertising devices in the form of eyeglasses, and the like, as well as the apparatus and method of their construction in general, are known and are found to be exemplary in the U.S. prior art are:

U.S. Pat. No. 2,824,308 issued to Duncan discloses a louvered screen eyeglass, comprising two screen inserts which fit into a particular design of an eyeglass frame. The frame is provided with a widened area which borders the lenses so that advertisement material, or the like, may be printed upon it. Likewise, the arm portions are substantially widened so as to allow room for printed matter, or the like, while, at the same time, blocking out light at the sides of the glasses. However, the displaying capabilities of this device are limited since the displayed material is confined to the frame of the glasses.

In U.S. Pat. No. 2,116,411, Philipson discloses an advertising device which is directed toward providing a device to display advertisement while, at the same time, being an article of utility. While Philipson's device is able to make use of the entire "lens surface" of the spectacles as a printing surface, the narrow, horizontal slit, which allows vision for the wearer of Philipson's glasses, also obstructs and limits his/her vision significantly—discouraging use of the glasses and even making its usage hazardous during many activities (such as operating a motor vehicle). Furthermore, since the horizontal slit is quite noticeable, it detracts from the appearance of the displayed material and competes for the attention of observers.

These patents, or known prior uses, teach and disclose various types of advertising devices in the form of eyeglasses, of sorts, and of various manufactures, and the like, as well as methods of their construction; but none of them, whether taken singly or in combination, discloses the specific details of the combination of the invention in such a way so as to bear upon the claims of the present invention.

SUMMARY OF THE INVENTION

The present invention discloses a pair of glasses in which the lenses of the glasses are made of a perforated, opaque-sheet material, having a great number of closely-spaced, small holes which provide the wearer with some vision while shielding the eyes from direct light or glare. The interior of the opaque-shielding lens is provided with a dark, matte finish to absorb light reflected from the skin of the wearer. The outside surfaces of the sun-shielding lenses are provided with a screened or printed pattern for viewing by persons looking at the wearer of the glasses. The frame of the glasses is provided with a bezel to permit easy installation and removal of the sun-shielding lenses so that lenses having different patterns on the outside surface may be substituted at will. The sun-shielding glasses are not intended to replace conventional sun glasses having precise optical surfaces, but are designed to provide a novel and decorative surface for the display of attractive patterns or advertising messages while providing protection for the eyes of the wearer.

An object, advantage, and feature of the present invention is to provide a novel display device that is worn in front of a person's eyes while still enabling that person to see.

Another object of the present invention is to provide a display device which is worn in front of a person's eyes and allows for messages and designs, or the like, to be printed, or similarly applied, upon its outer surface for display to others.

It is a further object of the present invention to provide the wearer with unobstructed vision through the area where the printed matter is displayed.

Yet, still another object of this invention is to provide a novel and improved construction of eyeglasses to display material on their outer surface whereby perforated sheet material is incorporated therein, allowing for the unrestricted view of the wearer while maximizing the amount of area available to display printed material in front of their eyes.

It is still a further object of the invention to allow for the attractive display of printed material, or the like, upon an article which is useful for protecting the eyes from high levels of light and glare.

It is still a further object of this invention to provide decorative sunglasses that still permit vision when worn in low-level, light conditions.

Still another object of the present invention is to provide an advertising device which serves both as an attractive article for personal adornment and an article of utility so that it will be enticing to use and display, therefore improving its effectiveness as an advertising device. The repeated and continued use that this advertising device encourages, makes it more effective since it generates more advertising time and attention. However, it is only the improved functioning and utility in combination with its attractive appearance that make this an attractive article for personal use and, thus because of this, a more effective and efficient advertising means.

These objects, together with other objects and advantages of the invention, reside in the details of the process and the operation thereof, as is more fully hereinafter described and claimed. References are made to drawings forming a part hereof, wherein like numerals refer to like parts throughout.

DESCRIPTION OF THE PREFERRED EMBODIMENTS

Figure 1:
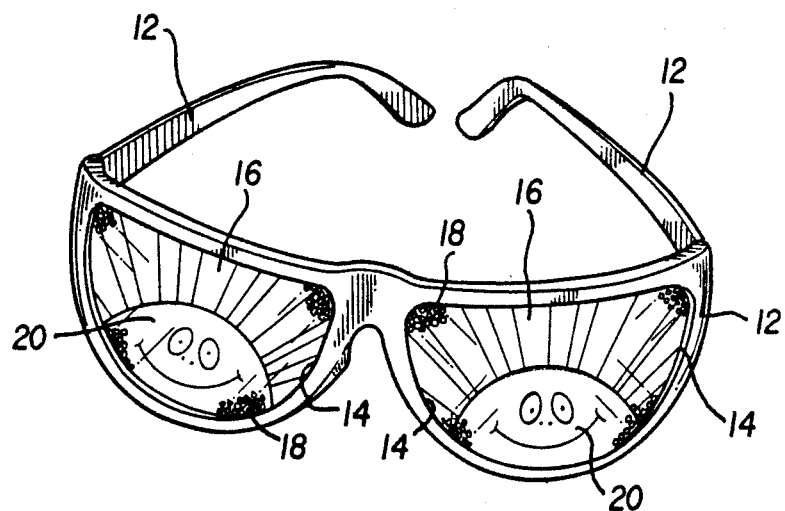
FIG. 1 is a front perspective view of the decorative glasses displaying a design according to a preferred embodiment and best mode of the invention.

Referring now to the drawings, and to FIG. 1 in particular, there is shown a pair of sun shielding glasses 10 having a conventional eyeglass frame 12 and provided with a conventional bezel 14 to permit installation and retention of a lens. A pair of opaque perforated lenses 16 are provided in the frame. Opacity may be provided by the selection of a natural opaque material, such as metal or plastic or the use of a clear material having a paint or ink coating on the exterior surface, the interior surface, or both surfaces of the lens material. A plurality of holes 18 which extend over the entire surface of the opaque lenses permit the wearer of the glasses 10 to have unobstructed vision while the opaque material screens and shields the eyes of the wearer from glare and direct sunlight. In the case of a transparent lens material that has a paint or ink coating, any indicia or design 20 or the like, the holes need not extend through the material of the lens. Each hole is simply an absence of the coating over each place where the hole is to be; thus, the coated lens, which is made of a clear material, is permitted to retain its transparency in the spots where holes are to be located.

The holes 18 may range in size from 0.01 inch to 0.10 inch, and likewise, the distance or separation between the holes separation may range from 0.05 inch to 0.50 inch, with the greater hole size accompanying greater separation, and vice versa. The holes 18 can be arranged in a uniform pattern of rows which are staggered alternately so as to make the holes equidistantly separated, or the holes can be positioned and arranged according to the appearance of the design or message applied on the exterior surface of the lenses so that the holes conform to and accentuate the appearance of the design or message. One method of accentuating a design or message is to have a particular size diameter of holes and a corresponding distance of separation between the holes assigned to particular areas of the lenses—perhaps the areas of the lenses beneath any of the printed letters in a trademark or a trademark logo—and different size diameter holes covering the rest of the lenses. The possibilities are limitless. The main concern of the arrangement of the holes is to not detract from the appearance of the design or message printed on the exterior surface of the lenses 16, but rather enhance the appearance of said design or message while providing an unobstructed view for the wearer of the present invention.

The spacing between the holes on the lenses provides a surface which may be decorated, and the decorated surface may be viewed by people observing the wearer of the glasses 10. As shown in FIG. 1, the external surfaces of the lenses are provided with indicia or a design 20 which may be ornamental or may present an advertising message. Lenses 16 are preferably made of a light-gauge metal or a plastic material, or the like, having sufficient flexibility to permit them to be inserted and removed from the bezel of the eyeglass frame so that lenses having different design motifs or advertising messages may be freely substituted in the frame.

Figure 2:
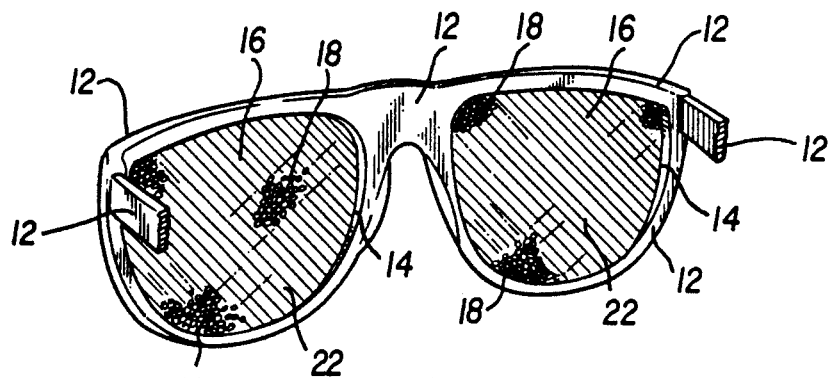
FIG. 2 is a rear perspective view of the glasses.

In FIG. 2, there is shown the rear of the glasses 10 and lenses 16. A dark, matte finish 22 is applied to the rear surface of the lenses to reduce reflection of light off of the rear surface of the lenses 16.

Figure 3:
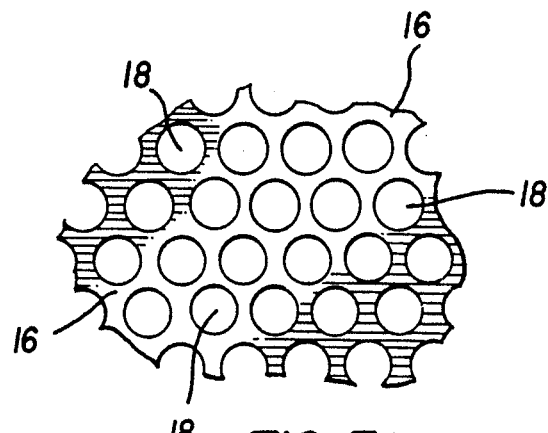
FIG. 3 is an enlarged portion of the perforated lens.

In FIG. 3, there is shown a portion of one of the perforated lenses. It shows the closely spaced array of holes 18, which may range in diameter from 0.01 inch to 0.10 inch, and the area of the opaque material that separates the holes, the distance of separation between holes ranging from 0.05 inch to 0.50 inch with the greater distance corresponding to the greater diameter, and vice versa.

An alternate embodiment could be a single-piece molded plastic construction, or the like. This embodiment has the lenses 16 and the frame 12 of the glasses fused together. The lenses 16 are still perforated in the manner or manners described above. The outer surface of said lenses having printed or similarly applied matter that is easily noticed and discernable by observers.

In all embodiments of the invention, a visual display, which is readily noticed by observers of the wearer of the glasses, is printed or similarly applied to the outer surface of the perforated lenses 16 which do not appreciably obstruct the field of vision of the wearer. Likewise, due to the inconspicuousness of the small holes which are positioned, either uniformly over the surface of the opaque lens material, or otherwise, so as to accentuate and define the message or design applied to outer surface of the lenses 16, the outer surface of the lenses provides an excellent display surface which does not detract from the matter to be exhibited. The glasses 16 provide a choice and unique display medium while providing the utility of a sun-screening device which protects the eyes of the wearer from high levels of light, helping to ensure their repeated and continued use. Furthermore, since these sunglasses do not use dark-tinted, transparent lenses, they still allow vision in low-level, light conditions, making them suitable for ornamental wear at night if desired. This aspect also serves to help increase the amount of time the glasses are worn—providing more display time for any advertisement material applied to the outer surface of the lenses.

The foregoing is considered as illustrative only of the principles of the invention. Since numerous modifications and changes will readily occur to those skilled in the art, it is not desired to limit the invention to the exact construction and operation as shown, but to cover all modifications which fall within the scope of the following claims.

I claim:

1. An advertising or ornamental display device in the form or spectacles comprising:

a conventional eyeglass frame for supporting lenses before the eyes of the wearer;

opaque, perforated, sheet-material lenses disposed in said eyeglass frame, said lenses are made of a clear plastic material and opacity is provided by adhering opaque film coating on the exterior surface, said lenses having a plurality of equi-distant openings therethrough disposed throughout the entire extent of said lenses, said openings having a major dimension of between 0.01–0.10 inches and permitting substantially uninhibited vision by the wearer throughout the entire extent of said opaque lenses while providing to persons other than the wearer, an outer surface on said lenses defining an apparent uninterrupted and continuous appearance, and a design or message indicia on said outer surface of said lenses whereby, said lenses provide protection for the eyes of the wearer while allowing substantially unrestricted vision on the part of the wearer and presenting a clear display of said indicia to persons other than the wearer.

2. The device of claim 1 wherein the lenses are made of a clear-plastic material and opacity is provided by an adhering, opaque-film coating on the interior surface thereof.

3. The device of claim 1 wherein the lenses are made of a clear-plastic material and opacity is provided by an adhering, opaque-film coating on the exterior surface thereof.

4. The device of claim 1 wherein the lenses are made of a clear-plastic material and opacity is provided by an adhering, opaque-film coating on the interior and exterior surfaces thereof.

5. The device of claim 1 wherein said frame has a bezel therein to permit retention, insertion and removal of lenses therefrom.

6. The device of claim 1 wherein said lenses have an interior surface defining a dark matte finish.

7. An advertising or ornamental display device in the form or spectacles comprising:

a conventional eyeglass frame for supporting lenses before the eyes of the wearer;

opaque, perforated, sheet-material lenses disposed in said eyeglass frame, said lenses are made of a clear plastic material and opacity is provided by adhering opaque film coating on the interior and exterior surfaces, said lenses having a plurality of equi-distant openings therethrough disposed throughout the entire extent of said lenses, said openings having a major dimension of between 0.01–0.10 inches and permitting substantially uninhibited vision by the wearer throughout the entire extent of said opaque lenses while provided to persons other than the wearer, an outer surface on said lenses defining an apparent uninterrupted and continuous appearance, and a design or message indicia on said outer surface of said lenses whereby, said lenses provide protection for the eyes of the wearer while allowing substantially unrestricted vision on the part of the wearer and presenting a clear display of said indicia to persons other than the wearer.

* * * * *